United States Patent
Bonanno

(10) Patent No.: US 9,903,269 B2
(45) Date of Patent: Feb. 27, 2018

(54) VALVE

(71) Applicant: CONTINENTAL AUTOMOTIVE GMBH, Hannover (DE)

(72) Inventor: Rosario Bonanno, Bad Soden (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/654,422

(22) PCT Filed: Dec. 5, 2013

(86) PCT No.: PCT/EP2013/075681
§ 371 (c)(1),
(2) Date: Jun. 19, 2015

(87) PCT Pub. No.: WO2014/095396
PCT Pub. Date: Jun. 26, 2014

(65) Prior Publication Data
US 2016/0195005 A1    Jul. 7, 2016

(30) Foreign Application Priority Data
Dec. 21, 2012  (DE) .................. 10 2012 224 130

(51) Int. Cl.
| | |
|---|---|
| *F16K 31/06* | (2006.01) |
| *F02B 37/16* | (2006.01) |
| *F16K 1/48* | (2006.01) |
| *F02B 39/00* | (2006.01) |

(52) U.S. Cl.
CPC .............. *F02B 37/16* (2013.01); *F02B 39/00* (2013.01); *F16K 1/485* (2013.01); *F16K 31/0655* (2013.01); *Y02T 10/144* (2013.01)

(58) Field of Classification Search
CPC ...... F02B 37/16; F02B 39/00; F16K 31/0644; F16K 31/0655; F16K 31/10; F16K 1/485; F02M 25/0836; F02M 25/0845
USPC ..................... 251/129.15, 129.19, 129.2
See application file for complete search history.

(56) References Cited

U.S. PATENT DOCUMENTS

| | | | | |
|---|---|---|---|---|
| 3,155,367 | A | * | 11/1964 | Gifford ................ F02M 1/00 251/357 |
| 4,475,711 | A | * | 10/1984 | Rountry ............ F16K 31/0655 251/129.15 |
| 4,790,346 | A | | 12/1988 | Kolze et al. |
| 5,497,975 | A | | 3/1996 | Achmad |
| 5,526,837 | A | | 6/1996 | Eaker |
| 2002/0088441 | A1 | | 7/2002 | Weldon |
| 2005/0279956 | A1 | | 12/2005 | Berger et al. |
| 2010/0206388 | A1 | * | 8/2010 | Bielab ............... F16K 31/0644 137/12 |

(Continued)

FOREIGN PATENT DOCUMENTS

| | | |
|---|---|---|
| CA | 2206528 | 6/1996 |
| CN | 201795056 U | 4/2011 |

(Continued)

*Primary Examiner* — Ian Paquette
(74) *Attorney, Agent, or Firm* — Cozen O'Connor

(57) ABSTRACT

A housing, a solenoid, a pin which can be moved by the solenoid, and a piston which is connected to the pin. The piston is pot-shaped and its base has an aperture. On the exterior of the base an arcuate yoke spans the aperture and the pin projects through the aperture in the base. The pin is connected to the arcuate yoke by a detent connection.

12 Claims, 2 Drawing Sheets

(56) References Cited

U.S. PATENT DOCUMENTS

| | | | | |
|---|---|---|---|---|
| 2010/0252763 | A1* | 10/2010 | Courth | B60T 8/367 251/129.15 |
| 2011/0068286 | A1* | 3/2011 | Nomichi | F16K 31/0655 251/129.15 |
| 2013/0134339 | A1* | 5/2013 | Miura | F16K 31/0655 251/129.15 |

FOREIGN PATENT DOCUMENTS

| | | |
|---|---|---|
| CN | 201827476 U | 5/2011 |
| DE | 83 33 595 | 6/1984 |
| DE | 10 2004 028 968 | 1/2006 |
| JP | 08-512124 | 12/1996 |
| JP | 10-122411 | 5/1998 |

\* cited by examiner

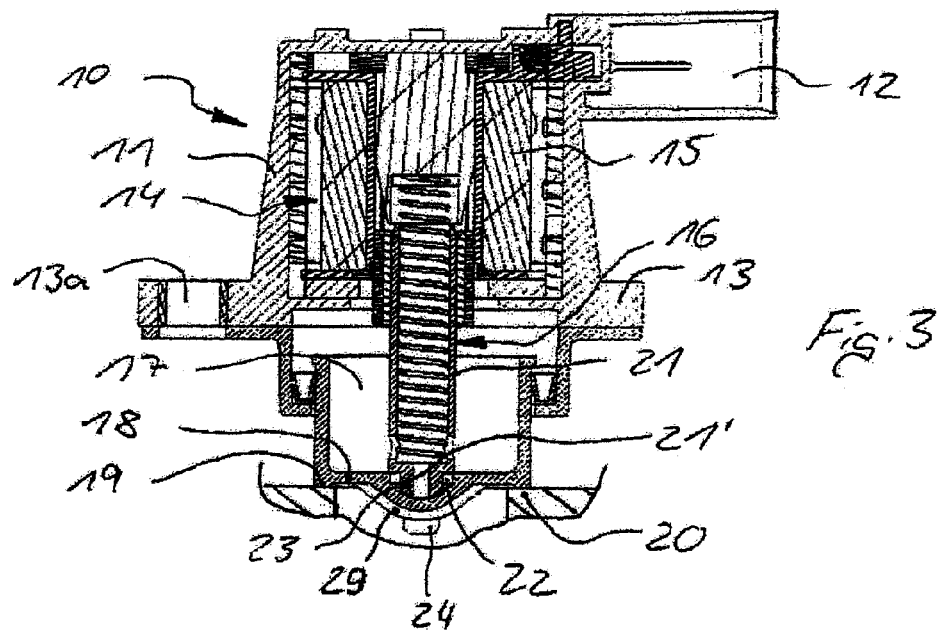
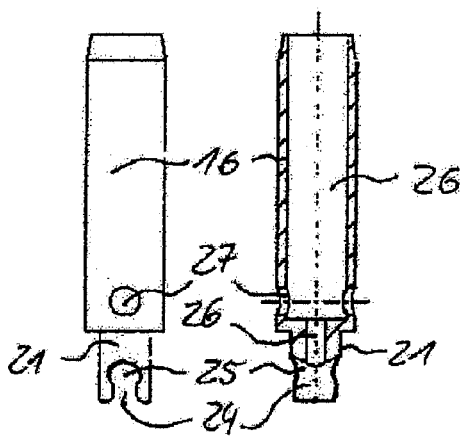
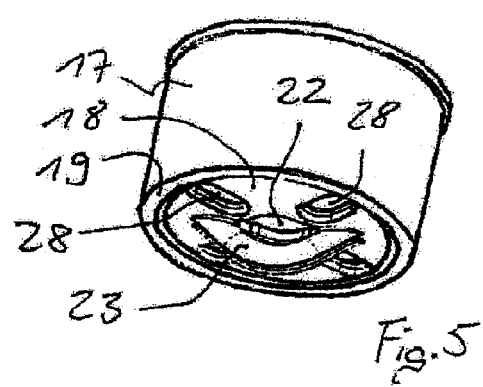
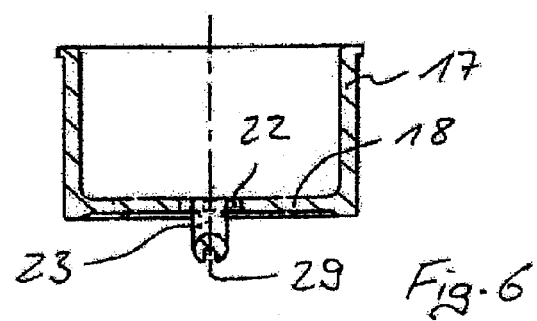

VALVE

CROSS REFERENCE TO RELATED APPLICATIONS

This is a U.S. national stage of application No. PCT/EP2013/075681, filed on Dec. 5, 2013. Priority is claimed on German Application No. DE102012224130.2, filed Dec. 21, 2012, the content of which is incorporated herein by reference.

BACKGROUND OF THE INVENTION

1. Field of the Invention

The invention relates to a valve having a housing, a solenoid arranged in the housing, a pin that can be moved by the solenoid, and a piston connected to the pin.

2. Detailed Description of Prior Art

Valves are used as recirculation air valves in turbochargers in motor vehicles to release a bypass to the intake side during thrust operation are known. To prevent an excessively powerful braking of the turbocharger and to ensure a rapid start up, rapid opening and closing of the valve is a significant requirement. In particular during closing, an important aspect is the immediate closure by the piston being placed against a valve seat. The valve seat is formed by the housing of the turbocharger on which the valve is flanged. This results in the valve seat not being located completely parallel with the piston, which would be necessary for a rapid and above all tight closure. To ensure secure closure nonetheless, the piston has to be adapted to the valve seat. To this end, it is known to construct the pin at the end thereof facing the piston with a ball head and to construct the corresponding receiving member on the piston as a ball socket. The disadvantage in this instance is the complex construction. The articulated connection of the piston to the pin enables relatively great pivoting, with large pivot angles being restrictive during rapid closure.

SUMMARY OF THE INVENTION

An object of the invention is to provide a valve that has a simple structure and which enables rapid and secure closure.

In one embodiment, the piston is constructed in a pot-like manner and the base thereof has an opening, at the outer side of the base an arcuate curved member spans the opening, the pin protrudes through the opening in the base, and the pin is connected to the arcuate curved member by a catch connection.

With the arcuate curved member, it is ensured that the piston can be pivoted relative to the pin by the curved member being displaced relative to the pin. Depending on the application, pivot angles from a few degrees to a few tenths of a degree can be produced. With the curvature of the curved member, the pivot angle of the piston can be adjusted. It is thereby ensured that only a small pivoting of the piston relative to the pin is possible. This small pivoting is sufficient to compensate for the positional discrepancies between the piston and the valve seat. At the same time, rapid closure of the valve is ensured since the pivot angle can be limited. The valve can thus be adapted to different application fields, whereby the valve has a wide field of use. In addition, the piston is constructed in a relatively simple manner with the arcuate curved member, which makes production easier.

The catch connection can be produced in a particularly simple manner when the pin at the end thereof facing away from the solenoid has a slot in which the curved member is engaged.

Secure engagement is achieved in that the slot has a catch step that preferably corresponds to the cross-section of the curved member.

A simple construction which enables good movability of the piston relative to the pin involves the arcuate curved member having a circular cross-section.

The production of the catch connection is simplified when the curved member has a slot at the side thereof facing away from the base. During engagement the slot enables a resilient deformation with subsequent relaxation when the catch step is reached. The depth of the catch step in the pin can be constructed to be larger, which brings about greater reliability with respect to release of the catch connection.

In one embodiment, the curvature of the arcuate curved member is bent toward the base of the piston. According to another embodiment a more simple producibility is achieved in that the arcuate curved member is bent away from the base of the piston.

In another advantageous embodiment, the region of the pin located inside the pot-like piston has a larger diameter than the opening in the base of the piston. The pin is thereby prevented from sliding through the opening. In this manner, a loss prevention mechanism is obtained for secure assembly. At the same time, in case of damage to the connection between the pin and piston, components of the pin are prevented from reaching the line.

To reduce the pressure loading of the valve, in particular the housing, the piston has additional openings in the base.

In one embodiment, the pin has a longitudinal hole that extends through the pin via which pressure compensation can be carried out in the housing.

For an even more rapid pressure compensation and in order, where applicable, to minimize noises as a result of the pressure compensation, the pin has a transverse hole that extends at right-angles relative to the longitudinal axis and which also extends through the pin and is connected to the longitudinal hole.

A rapid opening and closing of the valve as a result of small masses is achieved with a valve whose piston comprises plastics material.

BRIEF DESCRIPTION OF THE DRAWINGS

The invention is described in greater detail with reference to an embodiment. In the drawings:

FIG. 3 is a cross-section through the valve according to FIG. 2;

FIGS. 4A and 4B shows the pin as two views; and

FIGS. 5 and 6 show the piston as two views.

DETAILED DESCRIPTION OF THE PRESENTLY PREFERRED EMBODIMENTS

Figure 1:
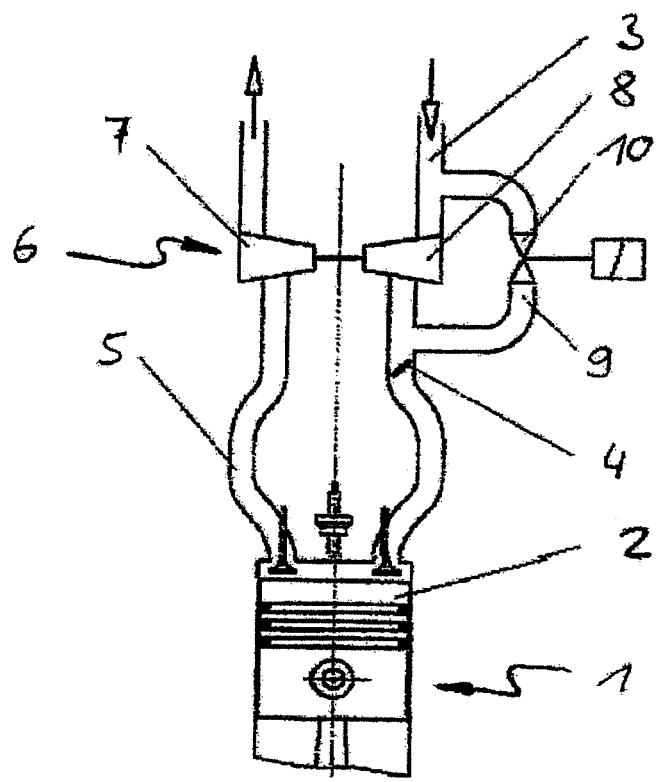
FIG. 1 is a schematic illustration of the arrangement of the valve.

FIG. 1 shows a portion of the drive train of a motor vehicle having a cylinder 1, a cylinder piston 2 which can be moved therein and a fresh air line 3 which opens in the cylinder 1 and which has a throttle valve 4 arranged therein and an exhaust gas line 5 that extends out of the cylinder 1. There is further arranged a turbocharger 6, which is connected to both lines 3, 5. The turbocharger 6 comprises a turbine 7 which is connected to the exhaust gas line 5 and a compressor 8 which is connected to the fresh air line 5. By a bypass line 9, pressure which has been built up by the compressor 8 when the throttle valve 4 closes can be guided back by directing away the compressed air. The bypass line 9 is opened or closed by a recirculation air valve 10.

Figure 2:
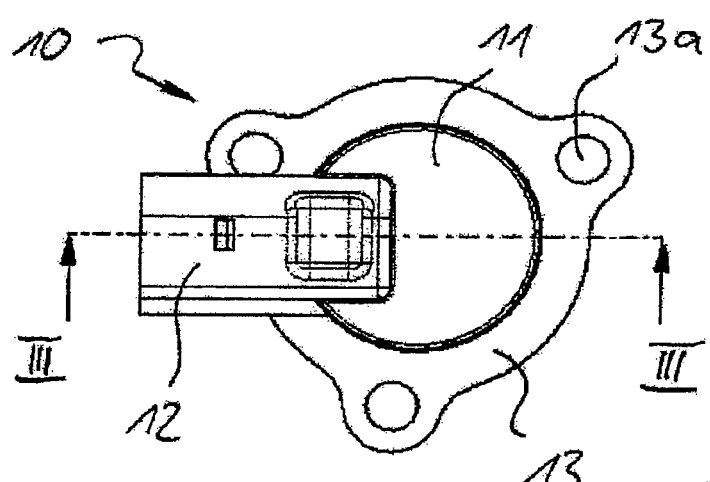
FIG. 2 is a plan view of the valve.

The valve 10 in FIG. 2 comprises a housing 11 with a bush 12 which is integrally formed for electrical connection of the valve 10. The housing 11 further has a formed-on flange 13 and three holes 13*a*, via which the housing 11 is flanged on the turbocharger 6 in the region of the bypass line 9.

In the housing 11, according to FIG. 3 a solenoid 14 is arranged with a coil 15 and a metal pin 16. The metal pin 16 is connected to a pot-like piston 17 of plastic material, which has at the periphery of the base 18 thereof a peripheral sealing edge 19. In the closure position shown, the sealing edge 19 is in abutment with the valve seat 20 to close the bypass line. The pin 16 has a region 21 located inside the pot-like piston 17 and which has a larger diameter than the opening 22 and at the side thereof facing away from the solenoid 14 a region 21' having a smaller diameter that protrudes through an opening 22 in the base 18 and which is engaged with an arcuate curved member 23 that spans the opening 22 at the outer side of the base. For the engagement, the pin 16 has a slot 24 in which the curved member 23 engages. The base of the slot in this instance has the same curvature as the curved member 23. This enables the curved member 23 to be able to be displaced relative to the pin, whereby the piston 17 can be pivoted relative to the pin 16.

FIGS. 4A and 4B shows the pin 16 with the region 21 of smaller diameter in which the slot 24 is arranged. On the base of the slot, there is formed a catch step 25 in which the curved member 23 engages. The catch step 25 has in the same manner as the curved member 23 a circular cross-section. The pin 16 further has a longitudinal hole 26 and a transverse hole 27 arranged at right-angles thereto. Both holes 26, 27 protrude through the pin 16 and serve to compensate for pressure in the housing 11, the transverse hole 25 being provided for faster pressure compensation.

FIGS. 5, 6 show the pot-like piston 17 with the base 18 and the opening 22. The arcuate curved member 23, which spans the opening 22, is arranged at the outer side of the base 18. The curved member 23 has a circular cross-section that has a slot 29 at the side facing away from the piston 17. The slotted construction of the curved member 23 enables easier engagement in the catch step 25 of the pin 16. In the base 18 there are arranged additional openings 28 used for pressure compensation.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A valve comprising:
   a housing;
   a solenoid arranged in the housing;
   a pin configured to be moved by the solenoid; and
   a cup-shaped piston connected to the pin and configured to mate with a seat in the housing and comprises:
      a base having an opening defined therein
      walls extending from a first side of the base to form the cup-shaped piston; and
      an arcuate curved member affixed to the base and configured as a bridge that spans the opening, at a second side of the base opposite the first side of the base, the arcuate member extending away from and extending beyond the second side of the base,
   wherein the pin protrudes through the opening in the base and the pin is connected to the arcuate curved member by a catch connection.

2. The valve as claimed in claim 1, wherein the arcuate curved member has a slot at the side thereof facing away from the base.

3. The valve as claimed in claim 1, wherein the arcuate curved member is bent longitudinally away from the piston.

4. The valve as claimed in claim 1, wherein a region of the pin located inside the cup-shaped piston has a diameter that is larger than a diameter of the opening.

5. The valve as claimed in claim 1, wherein the piston comprises a plastic material.

6. The valve as claimed in claim 1, wherein the piston has additional openings in the base.

7. The valve as claimed in claim 1, wherein the pin has a continuous longitudinal hole.

8. The valve as claimed in claim 7, wherein the pin has a transverse hole that extends substantially perpendicular to a longitudinal axis and the pin and is connected to the longitudinal hole.

9. The valve as claimed in claim 1, wherein an end of the pin facing away from the solenoid has a slot.

10. The valve as claimed in claim 9, wherein the slot has a catch step.

11. The valve as claimed in claim 10, wherein the catch step corresponds to a cross-section of the arcuate curved member.

12. The valve as claimed in claim 11, wherein the arcuate curved member has a circular cross-section.

* * * * *